US006668098B1

(12) United States Patent
Henry et al.

(10) Patent No.: US 6,668,098 B1
(45) Date of Patent: Dec. 23, 2003

(54) METHOD AND DEVICE FOR THE GEOMETRIC TRANSFORMATION OF AN IMAGE IN A COMPUTER COMMUNICATION NETWORK

(75) Inventors: Felix Henry, Rennes (FR);
Jean-Jacques Moreau, Rennes (FR);
Bertrand Berthelot, Rennes (FR); Eric Majani, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/449,680

(22) Filed: Nov. 24, 1999

(30) Foreign Application Priority Data

Dec. 14, 1998 (FR) ............................................. 98 15753

(51) Int. Cl.[7] .......................... G06K 9/64; G06K 9/36; G09G 5/00; G06F 7/00; G06F 19/173
(52) U.S. Cl. ...................... 382/277; 382/235; 382/243; 382/248; 382/278; 345/733; 345/740; 345/751; 707/101; 707/102; 709/238; 709/249; 709/250
(58) Field of Search ................................ 382/166, 235, 382/277, 243, 278, 248, 302, 249, 303, 304, 305, 307; 345/733, 734, 736, 740, 750, 751; 348/211.99, 211.1, 211.2, 211.3; 707/101, 102; 709/238, 241, 249, 250, 253, 101, 103, 104, 106, 107, 201, 203–205, 207, 211, 213, 219, 225, 247; 705/2, 3, 4, 8, 51, 56, 64

(56) References Cited

U.S. PATENT DOCUMENTS

| 5,689,641 A | 11/1997 | Ludwig et al. ........ 395/200.02 |
| 5,751,865 A | 5/1998 | Micco et al. ................ 382/296 |
| 5,822,537 A | * 10/1998 | Katseff et al. ............... 709/231 |
| 5,838,906 A | 11/1998 | Doyle et al. ........... 395/200.32 |
| 5,867,821 A | * 2/1999 | Ballantyne et al. ............. 705/2 |

FOREIGN PATENT DOCUMENTS

DE 19518321 A1 12/1995 ............ H04N/1/00

OTHER PUBLICATIONS

"A New Family of Algorithms for Manipulating Compressed Images," B.C. Smith et al., IEEE Transactions on Computer Graphics and Applications, Sep. 1993, pp. 1–20.
"Subband Coding of Images—Comparison With DCT", J.J. Lhuillier, et al., Signal Processing: Theories and Applications, vol. 3, No. 4, pp. 1645–1648, Sep. 5–8, 1988, Grenoble, XP000186364.
"Compressed Domain Processing Of JPEG—Encoded Images", B.C. Smith et al., Real–Time Imaging, vol. 2, No. 1, pp. 3–17, Feb. 1, 1996, XP000656168.
"New Algorithms For Processing Images In The Transform–Compressed Domain", S–F Chang, Proceedings of the SPIE, vol. 2501, Part 01, May 24, 1995, pp. 445–454, XP000610425.

* cited by examiner

*Primary Examiner*—Bhavesh M. Mehta
*Assistant Examiner*—Josef Kassa
(74) *Attorney, Agent, or Firm*—Fitzpatrick, Cella, Harper & Scinto

(57) ABSTRACT

A method for the geometric transformation of a compressed image, stored on a source appliance connected to one or more other appliances by a computer communication network, comprising the steps of choosing a set of appliances in the computer communication network adapted to implement a geometric transformation of an image in compressed form; selecting an appliance in the set for implementing the geometric transformation of the image in compressed form; of transmitting the compressed image to the selected appliance if it is different from the source appliance; and geometrically transforming the image in compressed form by means of the selected appliance. This method is used notably for a computer and printer installed on a network.

29 Claims, 4 Drawing Sheets

METHOD AND DEVICE FOR THE GEOMETRIC TRANSFORMATION OF AN IMAGE IN A COMPUTER COMMUNICATION NETWORK

BACKGROUND OF THE INVENTION

Field of the Invention

The present invention concerns a method and device for geometrically transforming a compressed digital image in a computer communication network.

It also concerns a method of transferring a compressed digital image over such a communication network with geometric transformation of the image.

Techniques of manipulating images stored in a compressed digital data file are known, and notably techniques of geometric transformation of images in their plane by rotations and symmetries, directly in a compressed form, without requiring decompression of the digital data file.

This manipulation of data in compressed form, and notably of digital images, is of great interest in the field of telecommunications, when images are transferred on a set of electronic appliances connected by a computer communication network.

Such is the case in particular when an image, stored in compressed form in the memory of a computer, is to be printed in an orientation different from that in which it is stored on the computer.

The manipulation of images in compressed form makes it possible to reduce the memory space required for the geometric transformation of the image and to accelerate its geometric transformation compared with a geometric transformation of the image in a decompressed form, without any loss of information in the image.

These techniques of manipulation of digital images in compressed form are notably very useful when the images, acquired and/or stored on an appliance, referred to as the source appliance, is to be transmitted in order to be displayed or printed by other appliances connected to the source appliance and to each other so as to form a computer communication network.

SUMMARY OF THE INVENTION

The aim of the present invention is to optimise the manipulation of an image in compressed form stored in a computer communication network.

Thus the present invention relates to a method for the geometric transformation of an image stored in a compressed digital data file, the said image being stored on a source appliance connected to one or more other appliances by a computer communication network.

This geometric transformation method is characterised in that it comprises the following steps:

choosing a set of appliances in the computer communication network adapted to implement a geometric transformation of an image in compressed form;

selecting an appliance in the said set in order to implement a geometric transformation of an image in compressed form;

transmitting the compressed digital data file to said selected appliance if it is different from the source appliance; and geometrically transforming the image in compressed form by the selected appliance.

Correlatively, the present invention also relates to a device for the geometric transformation of an image stored in a compressed digital data file, said image being stored on a source appliance connected to one or more other appliances by a computer communication network, characterised in that it comprises:

means of choosing a set of appliances in the computer communication network adapted to implement a geometric transformation of an image in compressed form;

means of selecting an appliance in the said set in order to implement a geometric transformation of an image in compressed form;

means of transmitting the compressed digital data file to said selected appliance if it is different from the source appliance, in order to geometrically transform the image in compressed form by means of the selected appliance.

The choice of the appliance in the communication network is thus made on all the appliances able to implement a geometric transformation of the image in compressed form.

By virtue of the invention, the image in compressed form is manipulated by an appliance in the communication network, which can possibly be different from the source appliance.

According to a preferred version of the invention, at the selection step, a comparison is made, when the number of appliances in the said set is greater than one, between one or more criteria amongst the operating speed of the microprocessors in the appliance, the size of the available memory in the appliances, the number of users of the computer communication network using the appliances, the transmission rate over the communication network between appliances, the latency time in order to be able to transmit the file over communication links between the source appliance and the other appliances and the number of necessary transmissions of the file over the network in order to reach a receiving appliance, and the most effective appliance is selected according to the criterion or criteria.

Thus the present invention makes it possible to choose, when several appliances in the communication network are able to manipulate the image in compressed form, the most effective appliance according to criteria of speed of transmission, speed of processing and available space for effecting this processing.

The computing and processing capacities of an appliance must be compensated for by the transfer time required to transmit the file to this appliance via the communication network.

According to another preferred version of the invention, the choosing step includes the following substeps:

the selection of a group of appliances in the computer communication network comprising said source appliance and one or more appliances adapted to transmit information to the source appliance;

the reception by the said source appliance of information transmitted by the appliances in said group about the capability of said appliances of implementing a geometric transformation of an image in compressed form; and the restriction of the group of appliances to said set of appliances in the computer communication network adapted to implement a geometric transformation of an image in compressed form.

Thus the inventory of the appliances in the communication network adapted to implement a manipulation in compressed form of the image is made at the level of the source appliance, amongst the group of appliances in the network having the capability of communicating information with the source appliance and notably of giving information about the manipulation techniques used by the appliances in this group and transmitting and receiving compressed digital data files.

According to a preferred version of the invention, which makes it possible to choose, at the level of the source appliance, the appliance in the network which will effect the manipulation of a compressed image, the device for the geometric transformation of an image is incorporated in this source appliance, storing said image in a compressed digital data file and connected to one or more appliances in a computer communication network.

According to an advantageous version of the invention, when the image is compressed in a digital data file by means of a coding method including at least one step of spectral decomposition into frequency sub-bands, the geometric transformation step uses a transcoding method applying a geometric transformation to symbols associated with the coefficients of the frequency sub-bands.

Thus the geometric transformation of the image can be effected directly on entropic codes or quantization symbols associated respectively with the coefficients of the frequency sub-bands obtained by spectral decomposition of the digital image, effecting, for example, at the very most an entropic decoding of the compressed digital data.

In a particularly advantageous aspect of the invention, a method of transferring an image stored in a compressed digital data file, between a source appliance and a receiving appliance in a computer communication network, is characterised in that it uses a method of geometric transformation of said image in accordance with the invention, and in that it also includes a step of transmitting the file of geometrically transformed compressed digital data to the said receiving appliance if it is different from said selected appliance.

Thus, when an image is transferred between a source appliance and a receiving appliance, requiring a geometric transformation of the image with a view to its processing via the receiving appliance, this manipulation in compressed form is effected in an optimum fashion on one of the appliances in the communication network, which may possibly be different from the source appliance and receiving appliance.

According to an advantageous version of the invention, allowing a particularly practical implementation of the invention, the device for the geometric transformation of an image is incorporated in a microprocessor, a read only memory containing a program for selecting an appliance in the network and transmitting the image to said appliance, and a random access memory containing registers adapted to record variables modified during the running of said program.

The invention also concerns a computer communication network characterised in that it has means for implementing the method of geometric transformation of an image or a device for the geometric transformation of an image according to the invention.

It also concerns a computer communication network characterised in that it has means for implementing the image transfer method according to the other aspect of the invention.

In a practical embodiment, the computer communication network has a source appliance storing the image in a compressed digital data file and a receiving appliance adapted to receive said image and to process said geometrically transformed image.

Preferably, the source appliance and/or the receiving appliance have means of implementing a geometric transformation of an image in compressed form.

Alternatively, or additionally, the communication network also has supplementary appliances having means of implementing a geometric transformation of an image in compressed form.

Advantageously, in a first embodiment for which the geometric transformation method is particularly well adapted, the source appliance is an appliance for acquiring a digital image, such as a computer, a scanner, a camera or a digital photographic appliance.

In a second embodiment, alternative or complementary to the previous one, the receiving appliance is an image display appliance, such as a computer or a digital television.

In a third embodiment, alternative or complementary to the first embodiment, the receiving appliance is an image printing appliance, such as a printer or a facsimile machine.

The present invention also concerns an information storage means, possibly partially or totally removable, which can be read by a computer or a microprocessor storing instructions of a computer program, characterised in that it is adapted to implement the method of geometric transformation of an image according to the invention.

It also concerns an information storage means, possibly partially or totally removable, which can be read by a computer or a microprocessor storing instructions of a computer program, characterised in that it is adapted to implement the image transfer method according to the invention.

The preferential or particular characteristics and the advantages of the geometric transformation device, of the communication network and of the aforementioned storage means are identical to those of the methods for the geometric transformation and transfer of an image according to the invention.

BRIEF DESCRIPTION OF THE DRAWINGS

Other particularities and advantages of the invention will also emerge from the following description, with reference to the accompanying drawings by way of non-limitative examples, in which.

DESCRIPTION OF PREFERRED EMBODIMENTS

Figure 1:
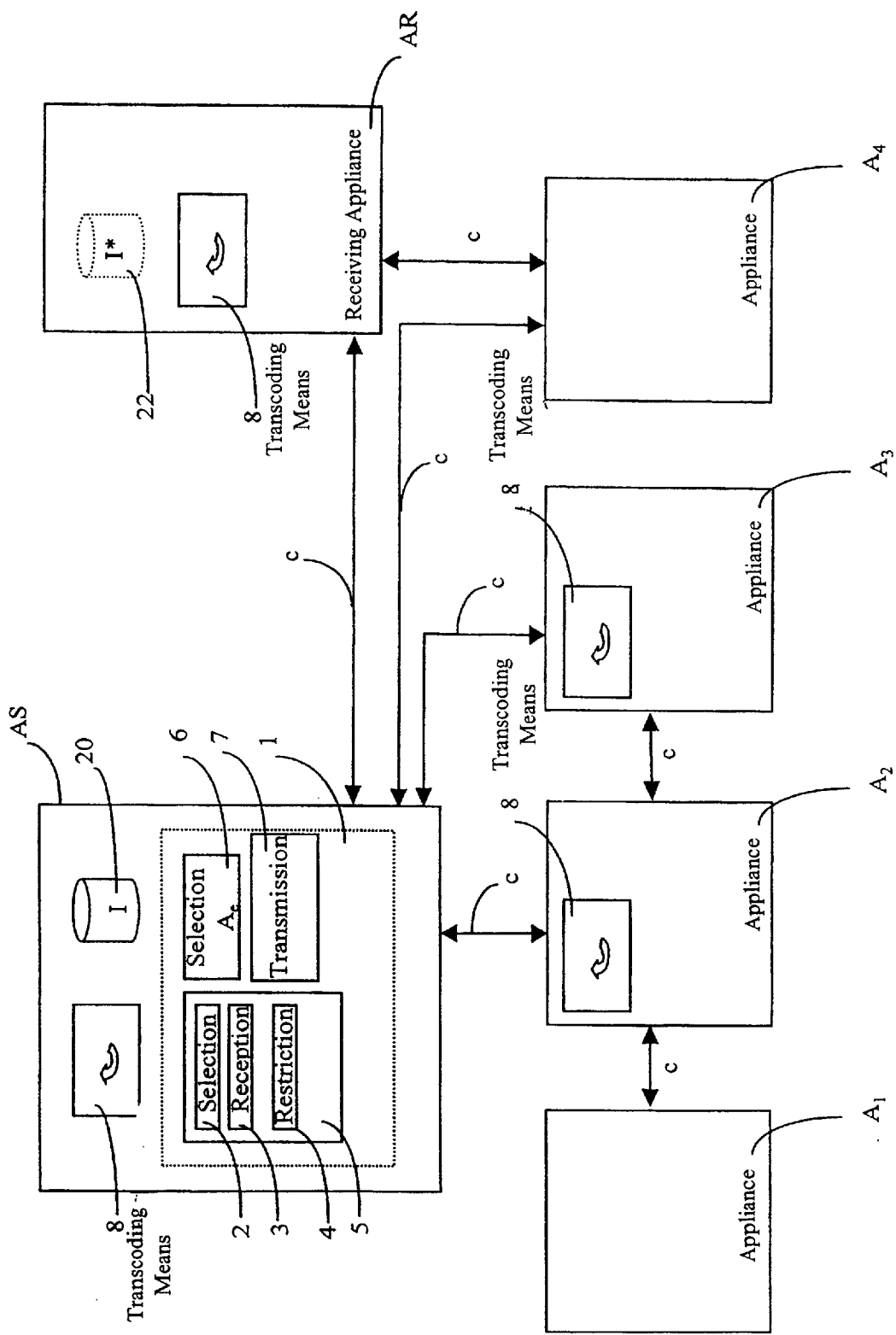
FIG. 1 is a block diagram illustrating a first embodiment of a communication network according to the invention.

A computer communication network in which the present invention can be implemented is illustrated schematically, according to a first embodiment, in FIG. 1.

This communication network has, in a conventional fashion, several appliances, A1, A2, A3, A4, AS and AR, which can communicate with each other, that is to say notably transfer information and files to each other via a communication network illustrated non-limitatively in FIG. 1 by the links c.

This communication network can be an internal network of small extent DAN ("Desk Area Network") or an external network of great extent WAN ("Wide Area Network").

In this example, the communication network has a source appliance AS storing an image I in a compressed digital data file 20.

This source appliance can be a computer or a scanner, a digital camera or a digital photographic appliance, that is to say an appliance for acquiring digital data representing an image I.

In this example, the image I is compressed by means of a coding method including at least a step of spectral decomposition into frequency sub-bands.

Such a coding method based on a spectral wavelet decomposition is well known in the state of the art. Consequently it will not be described in detail here, but the principle will be stated briefly below.

The image I is for example represented by a series of bytes, each byte value representing a pixel of the image I, which can be a black and white image, with 256 grey levels, or a colour image.

As the filtered signal has a wider carrier than the carrier of the original signal, the ends of the digital signal are generally processed prior to the decomposition proper, in order to avoid problems related to edge effect.

Processings of the start and end of a digital signal are adapted for example to effect symmetrical extensions of the digital signal or an aliasing of the decomposition filters.

In a normal fashion, a digital signal can be extended at its ends by an extension whose centre of symmetry is the last sample of the signal, or an extension whose centre of symmetry is the half-sample external to the signal, or an extension whose centre of symmetry is the last sample of the signal and where the samples external to the signal are multiplied by −1, or an extension whose centre of symmetry is the half-sample external to the signal and where the samples external to the signal are multiplied by −1, or an extension whose centre of symmetry is a zero at the ends of the signal and where the samples external to the signal are multiplied by −1.

The type of extension used is identical to the two ends of the digital signal during coding and spectral breakdown of the latter. On the other hand, the extension can be different during the decoding and spectral recomposition of the signal, according to the parity of the signal and the filter used.

A multiresolution spectral decomposition is then carried out by means of a circuit for decomposition into sub-bands, or analysis circuit, formed by a set of analysis filters, respectively associated with decimators by two. This decomposition circuit filters the image signal I in two directions, into sub-bands of spatial high frequencies and low frequencies. The circuit includes several successive analysis units for decomposing the image I into sub-bands according to several resolution levels.

In this way there is obtained, at each resolution level, a sub-band LL, containing the components of low frequency in both directions of the image signal I and referred to as the approximation sub-band, and several detail sub-bands containing components of high frequency in a first direction and components of low frequency in the second direction (sub-bands LH), components of high frequency in the second direction and components of low frequency in the first direction (subbands HL) and components of high frequency in both directions (sub-bands HH).

A quantization is next applied to the signal thus decomposed, and then an entropic coding is performed on the quantization symbols.

The signal thus compressed is stored in the file 20.

In addition, in order to subsequently allow, and in accordance with the invention, a geometric transformation of this file 20 without decoding it, two indicators Ih and Iv, associated respectively with the two directions, horizontal and vertical, of the image signal I, are entered in the compressed file 20. Each indicator Ih, Iv is preferably in the form of a supplementary bit inserted in the compressed file 20, having an initial value, for example the value zero, representing a normal order of the coefficients of the frequency sub-bands HH, LH, HL and LL in the direction associated with said indicator Ih, Iv.

As illustrated in FIG. 1, the communication network according to the invention also has a receiving appliance AR adapted to receive the image I stored in the file 20.

This receiving appliance AR can be an appliance for displaying an image having a screen for this purpose (computer, digital television).

This receiving appliance AR can also be an appliance for printing an image, such as a printer, a facsimile machine, etc.

In this example embodiment, the receiving appliance is adapted to process this image geometrically transformed with respect to its initial state before coding and storing in the file 20 of the source appliance AS.

Such may be the case for example when a document stored in the source appliance AS, comprising an image, is formatted in a so-called "landscape" format, whilst the receiving appliance is adapted to display or print documents only in a so-called "portrait" format. It is then necessary to geometrically transform the document, including the image, stored in the compressed data file on the source appliance AS, and in this case to effect a rotation through 90° on the stored document and image.

A method for the geometric transcoding of a compressed data file, containing a digital signal coded by a coding method including a step of spectral decomposition of this digital signal into frequency sub-bands as described previously, makes it possible to geometrically transform a compressed image without having to decompress it, which represents a not insignificant saving in time and memory space for effecting this geometric transformation of the image I.

This transcoding method is described in detail in the patent application FR 98 10734 in the name of the Applicant, whose content is incorporated by reference into the present description.

This transcoding method includes the following steps:
symbols associated with the coefficients of the frequency sub-bands in each direction of the digital signal are extracted.

This extraction step can include a simple reading of the coded digital signal in the compressed data file, the symbols being entropic codes associated respectively with the coefficients of frequency sub-bands obtained by spectral decomposition.

The extraction step can also include an entropic decoding of the compressed data file, the symbols being the quantization symbols associated respectively with the coefficients of the frequency sub-bands obtained by spectral decomposition.

The extraction step could possibly also include a dequantization of the coded digital signal, the symbols then being dequantized coefficients of the frequency sub-band obtained by spectral decomposition.

next the necessary geometric transformation is applied to the symbols. This geometric transformation can be a transformation by axial or central symmetry, a transformation by rotation through a multiple of 90° or a combination of these transformations;

the aforementioned two indicators Ih and Iv are also updated, representing a normal or reversed order of the symbols respectively in the two directions of the image signal. These indicators, stored in the compressed data file, are next interpreted during the decoding of the file, in order to decompress the image which was geometrically transformed; and the coded digital signal is reconstituted in the file by reversal of the extraction step, that is to say, for example, by entropic coding of the quantization symbols which have been transcoded.

The transcoding method comprises, when the geometric transformation applied comprises a rotation through 90° or 270°, a step of transposition of the frequency sub-bands HL including coefficients of low frequency in a first direction of the digital signal and of high frequency in a second direction of the digital signal, with the frequency sub-bands LH, with the same resolution level in the spectral decomposition, having coefficients of high frequency in said first direction and of low frequency in said second direction.

In addition, when the compressed data file contains several digital signals ordered in a predetermined order, the transcoding method includes a step of sequencing the digital signals according to the geometric transformation applied.

Such is the case notably when an initial digital signal, for example an image, is divided into signal sub-elements, each signal sub-element then being coded independently, and then stored in a predetermined order in the compressed data file to allow subsequent reconstruction of the initial digital signal.

Each subsignal A, B, C and D is transcoded separately into subsignals A', B', C' and D', these transcoded subsignals then being reordered according to the geometric transformation applied. Thus the compressed data file F, containing a successive sequence of signals A, B, C, D, becomes, at the end of the transcoding, a compressed data file F*, containing for example the successive sequence of signals B', A', D' and C'.

In this example embodiment, means 8 of effecting such a geometric transformation of an image I in compressed form, referred to in the remainder of the description as transcoding means 8, are incorporated in the source appliance AS and in the receiving appliance AR.

These transcoding means 8 comprise, as explained in detail in the patent application FR 98 10734, means of extracting symbols, means of applying a geometric transformation, means of updating the indicators and means of reconstituting the compressed image signal.

The communication network in this embodiment also has two additional appliances A2 and A3, also having means 8 of transcoding an image I.

According to the invention, and in order to effect the transcoding of the image I in an optimum fashion, the computer communication network includes a device 1 for the geometric transformation of an image I.

In this example, only one geometric transformation device 1 is present, in the source appliance AS of the communication network. However, the latter could include several geometric transformation devices 1 incorporated in various other appliances in the communication network.

According to the invention, this geometric transformation device 1 comprises:

means 5 of choosing a set of appliances in the computer communication network adapted to effect a geometric transformation of an image I in compressed form;

means 6 of selecting an appliance Ae in said set for effecting a geometric transformation of an image I in compressed form; and means 7 of transmitting the compressed digital data file 20 to said selected appliance Ae if it is different from the source appliance AS, in order to transform the image I geometrically in compressed form by means of this appliance Ae.

The selection means 6 are adapted, in this example embodiment, and non-limitatively, to compare one or more criteria of the appliances A and of the communication network, alone or by combining several criteria in order to take account of each of them in a weighted fashion.

These criteria can be chosen from amongst the operating speed of the microprocessors in the appliances, also referred to as the clock speed and generally expressed in megahertz, the size of the available memory in each appliance, expressed for example in bytes, or the number of users of the computer communication network who use each appliance.

It can also take into account the transmission rate over the communication network between appliances A, the latency time in order to be able to transmit the file over communication links c between the source appliance AS and the other appliances A and the number of transmissions of the file over the network necessary to reach the receiving appliance AR.

These selection means 6 thus make it possible to select, at a given moment, the most effective appliance Ae in the communication network for effecting the transcoding of an image I.

Preferably, the choosing means 5 include:

means 2 of selecting a group of appliances in the computer communication network comprising the source appliance AS and one or more appliances adapted to transmit information to the source appliance;

means 3 of receiving information transmitted by the appliances in this group about the capability of the appliances of implementing a geometric transformation of the image I in compressed form; and means 4 of restricting the group of appliances to a set of appliances in the computer communication network adapted to implement a geometric transformation of an image in compressed form.

Figure 2:
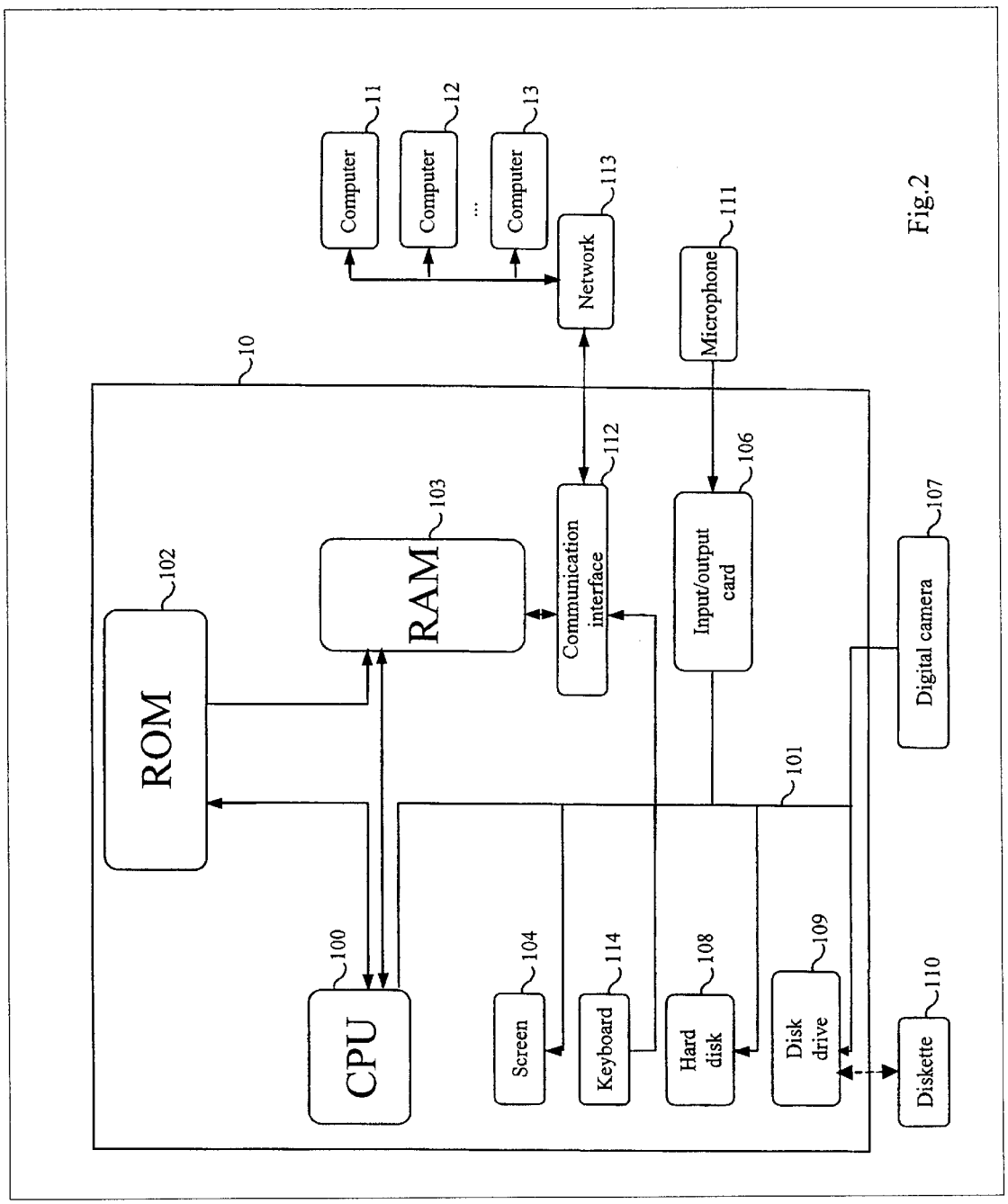
FIG. 2 is a block diagram illustrating a computer adapted to implement the geometric transformation and transfer methods according to the invention.

In practical terms, the geometric transformation device 1 as described above, that is to say the choosing means 5, the selection means 6 and the transmission means 7, are incorporated, as illustrated in FIG. 2, in a microprocessor 100 of a computer 10 constituting in this example the source appliance AS. A read only memory 102 contains a program for selecting an appliance in the network and transmitting the image I to this appliance, and a random access memory 103 contains registers adapted to record variables modified during the running of the program.

The computer 10 can be connected to different peripherals, for example a digital camera 107 or a scanner, or any other means of acquiring or storing images, by means of a graphic card. The computer can also be connected to a microphone 111 by means of an input/output card 106.

This computer 10 has a communication interface 112 connected to the communication network 113 in order to receive or send computer requests and transfer or receive documents. The communication network 113 is connected to other devices 11, 12, 13 identical to the computer 10, which, alone or in combination with other peripheral elements, constitute the appliances A1, A2, A3, A4 and AR of the communication network described in FIG. 1.

The computer 10 also has document storage means, such as a hard disk 108, or is adapted to cooperate, by means of a disk drive 109, with removable document storage means, for example a diskette 110.

The computer 10 could also have a compact disc player or a computer card reader (PC-CARD).

These storage means, fixed or removable, can also contain the code of the method for geometric transformation or transfer of an image according to the invention and of the transcoding method, which, once read by the microprocessor 100, will be stored on the hard disk 108.

By way of variant, the program enabling the geometric transformation device 1 and the transcoding device 8 to implement the invention can be stored in the read only memory 102.

In a second variant, the program can be received in order to be stored as described previously by means of the communication network 113.

The computer 10 also has a screen 104 serving, for example, as an interface with an operator by means of the keyboard 114 or any other means such as a mouse.

The central unit 100 will execute the instructions relating to the implementation of the invention. On powering up, the programs and methods relating to the invention stored in a non-volatile memory, for example the read only memory 102, are transferred into the random access memory 103, which will then contain the executable code of the invention as well as the variables necessary for implementing the invention.

The communication bus 101 allows communication between the different sub-elements of the computer 10 or connected to it. The representation of the bus 101 is not limitative and notably the microprocessor 100 is able to communicate instructions to any sub-element directly or by means of another subelement.

A description will now be given of the method of transferring an image I according to the invention, between the source appliance AS and the receiving appliance AR, with reference to FIG. 3 and for a communication network in accordance with the embodiment described previously with reference to FIG. 1.

This transfer method first of all uses a method of geometric transformation of the image I comprising a step of initially choosing a set of appliances (Ai) in the computer communication network adapted to implement a geometric transformation of an image in compressed form.

This choosing step is broken down into three substeps:
a step E1 of selecting a group of appliances in the computer communication network comprising the source appliance AS and one or more appliances adapted to transmit information to the source appliance AS.

In this example, the group of appliances thus selected comprises the source appliance AS, the appliance AR and the appliances A2, A3 and A4 which are connected via the network by the computer communication links c.

On the other hand, the appliance A1, which does not communicate directly with the source appliance AS, will be excluded from this group.

This selection can be made by attempting to establish communication with each appliance, from the source appliance AS, or through an a priori knowledge of the characteristics of the communication network.

It can advantageously be made also by sending, from the source appliance AS, a single request broadcast over the network which invites each appliance in the network which receives this request to communicate with the source appliance in order to make itself known to the latter.

The solutions which attempt to establish communication with the appliances in the network have the advantage of being able to take into account, in real time, modifications which may occur on the communication links c of the communication network.

It thus makes it possible to know the appliances in the network able to communicate, to the source appliance AS, information about their capability of effecting a transcoding of the compressed digital data file 20;
a step E2 of reception, by the source appliance AS, of this information transmitted by the appliances AR, A2, A3 and A4 in the group about their capability of implementing a geometric transformation of the image I in compressed form. For this purpose, the source appliance AS sends for example a computer request in order to request the transfer of this information, and the appliances AR, A2, A3 and A4 in the group send a qualitative response, such as capable/incapable, or yes/no; and
a step E3 of restricting the group of appliances to a set of appliances (Ai) in the computer communication network adapted to implement a geometric transformation of an image in compressed form.

In this case, only the appliance A4 does not have transcoding means 8 and the set (Ai) thus chosen includes the appliances AS, AR, A2 and A3.

In the general geometric transformation method, a test is performed at step E4 in order to determine whether or not the set (Ai) is empty.

If this set (Ai) is not empty, as in the example embodiment described, a step of selecting an appliance (Ae) in this set (Ai) is secondly carried out for effecting a geometric transformation of the image I in compressed form.

It is checked first of all, in a test step E5, whether the number of appliances in the set (Ai) is equal to one. In this case, this appliance (Ai=Ae) is automatically selected in a step E6.

If not, when the number of appliances in this set (Ai) is greater than one, and here equal to four, a comparison is for example made, in a selection step E7, between one or more criteria amongst the operating speed of the microprocessors in the appliance, the size of the available memory in the appliances, the number of users of the computer communication network using the appliances, the transmission rate over the communication network between appliances, the latency time in order to be able to transmit the file over communication links c between the source appliance AS and the other appliances and the number of necessary transmissions of the file over the network in order to reach a receiving appliance AR.

In practice, the source appliance AS sends computer requests to each appliance AR, A2 and A3 in the set (Ai) in order for each appliance in response to send to the source appliance AS quantitative information, for example on its clock speed, the size of its available memory or the number of users, that is to say of appliances in the communication network, already connected to this appliance, or to have information on the communication links in the network, for example on the transmission rate over the communication network between appliances, the latency time for being able to transmit the file over communication links between the source appliance and the other appliances and the number of necessary transmissions of the file over the network in order to reach the receiving appliance.

Preferably, this quantitative information on each appliance and on the communication network can be transmitted to the source appliance at the receiving step E2, at the same time as the qualitative response sent by the appliances AR, A2, A3 and A4 about their capability of effecting a geometric transformation of the image in compressed form.

A comparison of one of these criteria or of several of these combined criteria makes it possibly to determine the most effective appliance Ae in the set (Ai).

It will easily be understood that, the higher the operating speed of such an appliance Ae, the greater the size of its available memory and the smaller the number of users, the more effective it will be.

However, the computing and processing capacity of an appliance in the set (Ai) must be compensated for by the transfer time necessary for transmitting the compressed digital data file to be processed to this appliance via the communication network.

This method of selection is particularly advantageous since it is implemented in an interactive fashion with the communication network and takes into account changes in the load on the network in terms of users and tasks to be performed on this network.

Naturally, this appliance Ae in the set Ai could also be selected without taking such criteria into account. An appliance in the network could thus be chosen in a predetermined fashion and be adapted to effect the geometric transformation of the image in compressed form whatever the source appliance storing the image and whatever the receiving appliance for which the transcoded image is intended.

It is assumed in the remainder of this description that the appliance A2 is the appliance selected as the most effective Ae.

In a test step E8, it is checked whether the selected appliance A2 is the source appliance AS.

If it is different from this source appliance AS, such as in this case the appliance A2, the compressed digital data file 20 is transmitted to this selected appliance A2 during a transmission step E9.

The geometric transformation of the image I in compressed form via the selected appliance A2 is then effected by the transcoding means 8 in a transcoding step E10.

As explained above, the image I being compressed in a digital data file 20 by a coding method including at least one step of spectral decomposition into frequency sub-bands, the geometric transformation step proper uses a transcoding method applying a geometric transformation to symbols associated with the coefficients of the frequency sub-bands.

This transcoding method effects the geometric transformation of the image without decoding it, whence a saving in space and time for effecting this geometric transformation. In addition, by avoiding decompressing and recompressing the image I, the loss of information on the image which occurs at each compression at the image I is reduced.

Finally, in a test step E11, it is checked whether the selected appliance Ae, on which the transcoded file 20 is, is identical to the receiving appliance AR.

In the affirmative, the method of transferring the image according to the invention is terminated and the image I*, thus transformed geometrically and stored in compressed form in the file 20, can be processed by the receiving appliance AR.

If the selected appliance Ae is different from the receiving appliance AR, such as here the appliance A2, a step E12 of transmitting the file 20 of geometrically transformed compressed digital data is implemented for transferring the image I* to the receiving appliance AR. The latter can then process the image I*, and notably display it on a screen or print it.

For this purpose, a method of decoding the transcoded image I* comprises notably the following steps:

entropic decoding which is the reverse of the entropic coding applied during the compression of the digital signal;

dequantization of the digital signal in order to find the coefficients of the frequency sub-bands;

reading in each direction of the signal of the value of the indicator Ih, Iv representing the normal or reversed state of the coefcients of the frequency sub-bands in the associated directions;

calculation of the parity of the digital signal in each direction;

transformation of the original spectral recomposition filters, by symmetry or by shifting of an index, as a function of the parity of the signal and of the value of the indicator Ih, Iv in each direction; and spectral recomposition of the digital signal by means of the transformed recomposition filters.

It is known that the conditions for perfect reconstruction of a digital signal entail the parity of the low-pass $h2(k)$ and high-pass $g2(k)$ recomposition filters being identical to that of the decomposition filters h1 (I) and $g1(k)$.

In addition the low-pass $h1(k)$ decomposition and low-pass $h2(k)$ recomposition filters are symmetrical.

In general terms, the decomposition and recomposition filters satisfy the following equations, which ensure perfect reconstruction of the digital signal S:

$$g1(k)=(-1)^k h2(-k+1)$$

$$\text{and } g2(k)=(-1)^k h1(-k+1)$$

The transformation of the recomposition filters h2 and g2 makes it possible to modify these filters to take account of the reversals in the order of the coefficients in the sub-bands and to make symmetrical or offset by an index the conventional spectral recomposition filters $h2(k)$ and $g2(k)$.

The transformation of the filters can also, for a simplification of the use of the decoding device, be interpreted as a keeping of the original recomposition filters and a modification of their application. In this interpretation, the synthesis filters h2 and g2 are used systematically. If the filters are of even length, the opposite of the high-pass signal is taken for effecting the spectral recomposition. In addition, if the digital signal is of even length and the indicator Ih (or Iv) is equal to 1, the oversampling carried out during the spectral recomposition is adapted to insert the first zero before the first coefficient of the signal (whereas in a conventional spectral recomposition, the first zero is inserted after the first coefficient).

Optionally, if conventionally during coding a start processing and/or an end processing had been applied to the digital image signal, for example a symmetrical extension of the ends of the signal, the coding method also includes steps of:

calculating the parity of the spectral recomposition filters $h2(k)$ and $g2(k)$;

choosing the processing to be applied to the digital signal according to the parity of the spectral recomposition filters $h2(k)$ and $g2(k)$, the parity of the signal and the value of the indicator Iv or Ih; and applying the chosen processing to the digital signal.

In fact, as is known in a spectral decomposition, when there is applied to the ends of a signal respectively a processing A and a processing B before its spectral decomposition, it is necessary to apply, before its reconstruction, a processing A' and a processing B', the choice of these processings depending on the parity of the filters and the parity of the signal to be reconstructed.

The steps of choosing and applying the processing reverse the end processings when the coefficients of the signal of the sub-bands have been reversed.

Finally, the decoding method can also include a prior step of dividing the compressed data file into several digital signals ordered in a predetermined order, the size of the signals being determined according to the value of the indicators Ih, Iv.

This is because when, during coding, the initial digital signal was divided into sub-signals and this division is different at the ends of the signal, the choice is made, according to the value of the indicators Ih, Iv in each direction of the signal, of the division to be effected for redividing the transcoded signal into subsignals of size identical to that of the subsignals divided during coding.

Figure 3:
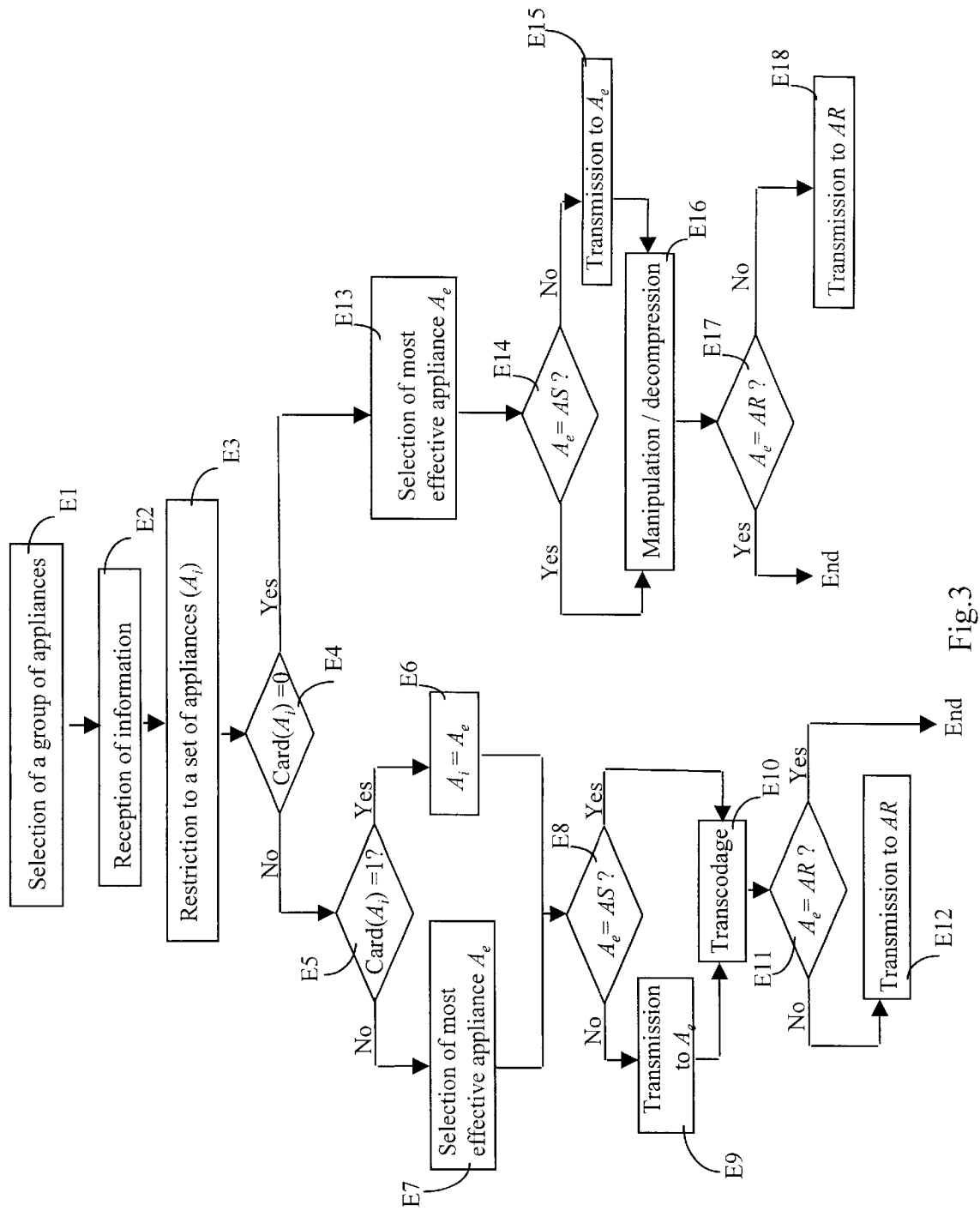
FIG. 3 is a flow diagram illustrating the different steps of the methods for geometric transformation and transfer of an image according to the invention.

As illustrated in FIG. 3, the general transfer method also includes steps E13 to E18 for being able to effect the geometric transformation of the image when no appliance in the communication network has transcoding means 8, that is to say when, at the test step E4, the set (Ai) is empty.

In this case, there is selected, for example at step E13, the most effective appliance in the group for effecting the geometric transformation of the image I in a decompressed fashion, according to criteria similar to those used at the selection step E7.

If the most effective appliance Ae is different from the source appliance AS (test step E14), the file 20 containing the image I is transmitted to the most effective appliance in a transmission step E15.

The geometric transformation of the image is then effected in a step E16, by completely decompressing the file 20, geometrically transforming the image thus decoded and then once again compressing the image in a digital data file.

A test step E17 checks whether the most effective appliance Ae is identical to the receiving appliance AR. In the negative, the digital data file 20 is then transferred to the receiving appliance AR in order to be processed.

The geometric transformation and transfer methods according to the invention consequently make it possibly to geometrically transform a compressed image in an optimum fashion, using the resources of a computer communication network.

A description will be given, by way of example, of an embodiment in which it is particularly advantageous to implement the present invention, with reference to FIG. 4.

A computer AS and a printer AR are considered, which constitute the communication network and are connected by a computer communication link c.

The user constructs a document 21 on the computer AS constituting here the source appliance. This document 21 can include text and one or more images I. The text data are however not concerned here. The image I is stored in the file 20 in compressed form, according to a coding method based on a decomposition of the digital image signal into frequency sub-bands.

Figure 4:
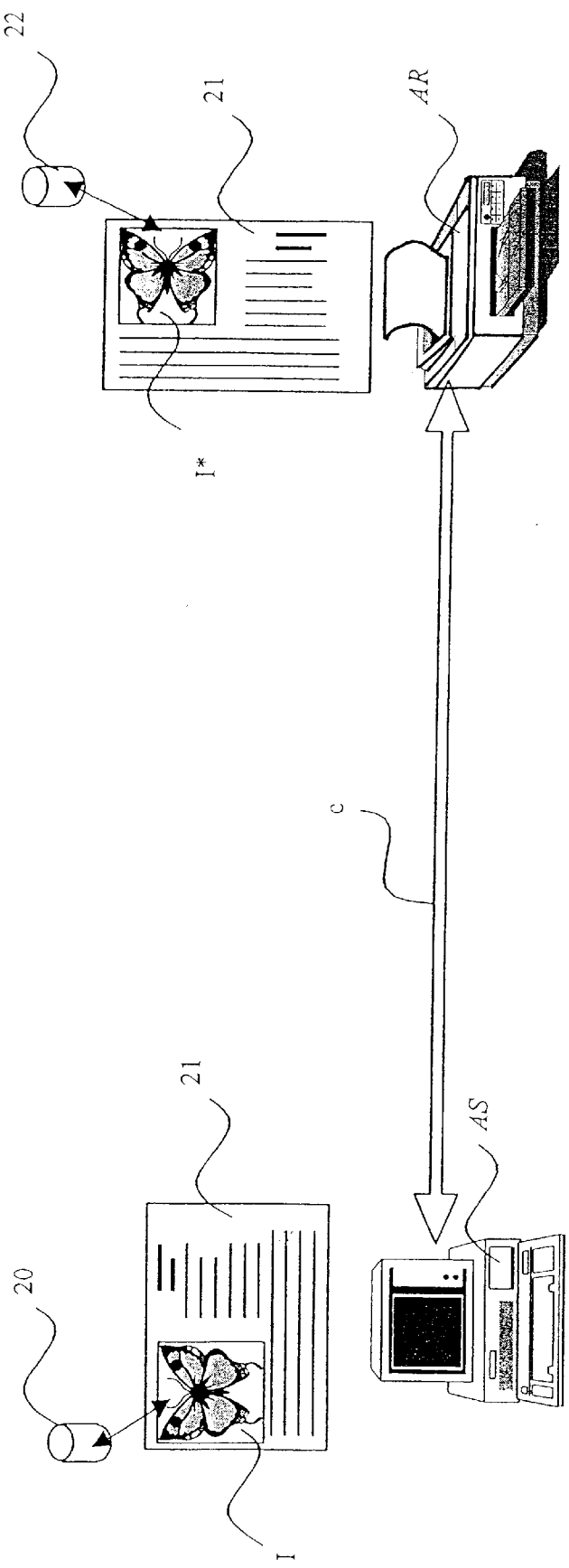
FIG. 4 is a block diagram illustrating a second embodiment of a communication network according to the invention.

As illustrated in FIG. 4, the document 21 is in "landscape" format, in the width of the sheet.

It is then necessary to effect a rotation of the data through 90° in order to print the document on the printer AR, here constituting the receiving appliance AR within the meaning of the invention. This is because printers generally print from top to bottom in "portrait" format, in order to have as narrow a print head as possible.

A rotation must be applied to the image I in order to print it.

Initially, the computer AS consults the printer AR, in order to know whether the latter can communicate information to it. If not, rotation of the image is effected on the computer either by transcoding, if the computer has transcoding means 8 as described previously, or by decompressing the file 20. Next, the new file 22 is transmitted to the printer AR in order to print the document 21.

If the printer AR can communicate information to the computer AS, the latter then receives information about the capability of the printer AR of applying a transcoding of the image I.

If this transcoding is applicable in the printer AR and not in the computer AS, the file 20 intended for the printer AR is sent to it without prior processing and the digital data are transcoded in the printer AR before being decoded and printed in the form of the document 21.

If transcoding is applicable in the computer AS and not in the printer AR, the image I is transcoded in the computer AS, and the new file 22 is transmitted to the printer AR in order to print the document 21.

If transcoding is applicable in both appliances, the most effective appliance is selected as described previously, for example by comparing the operating speeds of the microprocessors in each of the appliances AR and AS.

It can also be decreed that one of the appliances, for example the source appliance AS, is chosen for effecting the transcoding of the file 20.

As before, if it is a case of the printer AR, the file 20 is sent without processing to the printer AR, and transcoding takes place on the printer.

If it is a case of the computer AS, the transcoding is effected on the computer, and the new file 22 is then transmitted to the printer AR ready to be printed.

Should none of the appliances have transcoding means compatible with the compressed data file 20, a geometric transformation of the image is performed in a conventional fashion, by first decompressing the file 20. This decompressed manipulation can be effected by one or other of the appliances AR and AS, which can be chosen according to effectiveness criteria similar to those used previously.

Naturally, numerous modifications can be made to the example embodiments described above without departing from the scope of the invention.

Thus the method for the geometric transformation of the image according to the invention can be implemented without there being any transfer of the image to a receiving appliance different from the source appliance. The geometric transformation is then performed by an appliance in the network determined in accordance with the invention, and the image thus transcoded is then transmitted once again to the source appliance.

In addition, the transcoding device 8 may not be incorporated in the source appliance AS or in the receiving appliance AR.

Moreover, the invention also applies to an image compressed by means of a coding method based on a discrete cosine transform DCT, the transcoding means 8 then having to be adapted to this type of transformation.

What is claimed is:

1. A method of geometrically transforming an image stored in a compressed digital data file, where the image is stored on a source appliance connected to one or more other appliances by a computer communication network, said method comprising the steps of:
- choosing a set of appliances in the computer communication network adapted to implement the geometric transformation of the image in compressed form;
- selecting an appliance from the set of appliances in order to implement the geometric transformation of the image in compressed form;
- transmitting the compressed digital data file to the selected appliance if it is different from the source appliance; and
- geometrically transforming the image in compressed form by the selected appliance,
  - wherein in said selecting step, a comparison is made, when the number of appliances in the set is greater than one, between one or more criteria amongst an operating speed of microprocessors in the appliance, a size of available memory in the appliances, a number of users of the computer communication network using the appliances, and a transmission rate over the communication network between appliances.

2. A method according to claim 1, wherein also amongst the criteria are a latency time in order to be able to transmit the file over communication links between the source appliance and the other appliances, and a number of necessary transmissions of the file over the network in order to reach a receiving appliance, wherein the most effective appliance is selected according to a result of the comparison.

3. A method according to claim 1, wherein said choosing step includes the following substeps:
- selecting a group of appliances in the computer communication network comprising the source appliance and one or more appliances adapted to transmit information to the source appliance;
- receiving, by the source appliance, information transmitted by the appliances in the group about the capability of the appliances for implementing the geometric transformation of the image in compressed form; and
- restricting the group of appliances to the set of appliances in the computer communication network adapted to implement the geometric transformation of the image in compressed form.

4. A method according to claim 1, the image compressed into the digital data file by a coding method including at least one step of spectral decomposition into frequency sub-bands, wherein said geometric transformation step uses a transcoding method applying a geometric transformation to symbols associated with the coefficients of the frequency sub-bands.

5. A method of transferring an image stored in a compressed digital data file, between the source appliance and a receiving appliance in the computer communication network, wherein said method uses a method of geometric transforming the image in accordance with claim 1, and said method also includes transmitting the geometrically transformed compressed digital data file to the receiving appliance if it is different from the selected appliance.

6. A computer communication network, wherein said network has means for implementing the image transfer method according to claim 5.

7. An information storage medium, readable by a microprocessor, storing instructions for a computer program, wherein said medium is adapted to implement the image transfer method according to claim 5.

8. An information storage medium, readable by a microprocessor, and storing instructions for a computer program, wherein said medium is adapted to implement the method of geometrically transforming an image according to claim 1.

9. A device for geometrically transforming an image stored in a compressed digital data file, where the image is stored on a source appliance connected to one or more other appliances by a computer communication network, said device comprising:
- means for choosing a set of appliances in the computer communication network adapted to implement the geometric transformation of the image in compressed form;
- means for selecting an appliance from the set of appliances in order to implement the geometric transformation of the image in compressed form; and
- means for transmitting the compressed digital data file to the selected appliance if it is different from the source appliance, in order, to geometrically transform the image in compressed form by means of the selected appliances,
  - wherein said selection means is adapted to compare one or more criteria amongst an operating speed of microprocessors in the appliance, a size of available memory in the appliances, a number of users of the computer communication network using the appliances, and a transmission rate over the communication network between appliances.

10. A device according to claim 9, wherein also amongst the criteria are a latency time in order to be able to transmit the file over communication links between the source appliance and the other appliances, and a number of necessary transmissions of the file over the network in order to reach a receiving appliance, wherein the most effective appliance is selected according to a result of the comparison.

11. A device according to claim 9, wherein said choosing means includes:
- means for selecting a group of appliances in the computer communication network comprising the source appliance and one or more appliances adapted to transmit information to the source appliance;
- means for receiving information transmitted by the appliances in the group about the capability of the appliances for implementing the geometric transformation of the image in compressed form; and
- means for restricting the group of appliances to the set of appliances in the computer communication network adapted to implement the geometric transformation of the image in compressed form.

12. A device according to claim 6, wherein said device incorporates in the source appliance storage means for storing the image in the compressed digital data file connected to one or more appliances in the computer communication network.

13. A device according to claim 6, wherein, incorporated in a microprocessor, is a read only memory containing a program for selecting the appliance in the network and transmitting the image to the appliance, and a random access memory containing registers adapted to record variables modified during the running of said program.

14. A computer communication network, wherein said network has means for implementing the method of geometrically transforming an image according to claim 1.

15. A computer communication network, wherein said network has a device for geometrically transforming an image according to claim 9.

16. A computer communication network according to claim 15, wherein said network has a source appliance storing the image in the compressed digital data file and a receiving appliance adapted to receive the image and to process the geometrically transformed image.

17. A computer communication network according to claim 16, wherein the source appliance and/or the receiving appliance have means for implementing the geometric transformation of image in compressed form.

18. A computer communication network according to claim 17, wherein, the image is compressed in the digital data file by a coding method including at least one step of spectral decomposition into frequency subbands and said means for implementing the geometric transformation is transcoding means adapted to geometrically transform symbols associated with the frequency sub-band coefficients.

19. A computer communication network according to claim 16, wherein said network also has supplementary appliances having means for implementing the geometric transformation of the image in compressed form.

20. A computer communication network according to claim 16, wherein the source appliance is a digital image acquisition appliance.

21. A computer communication network according to claim 20, wherein the source appliance is a computer.

22. A computer communication network according to claim 20, wherein the source appliance is a scanner.

23. A computer communication network according to claim 20, wherein the source appliance is a digital camera or photographic appliance.

24. A computer communication network according to claim 16, wherein the receiving appliance is an image display appliance.

25. A computer communication network according to claim 24, wherein the receiving appliance is a computer.

26. A computer communication network according to claim 24, wherein the receiving appliance is a digital television.

27. A computer communication network according to claim 16, wherein the receiving appliance is an image printing appliance.

28. A computer communication network according to claim 29, wherein the receiving appliance is a printer.

29. A computer communication network according to claim 27, wherein the receiving appliance is a facsimile machine.

* * * * *

UNITED STATES PATENT AND TRADEMARK OFFICE
CERTIFICATE OF CORRECTION

PATENT NO. : 6,668,098 B1
DATED : December 23, 2003
INVENTOR(S) : Félix Henry et al.

It is certified that error appears in the above-identified patent and that said Letters Patent is hereby corrected as shown below:

Column 15,
Line 56, "geometric" should read -- geometrically --.

Column 16,
Line 2, "and" should be deleted;
Line 19, "order," should read -- order --;
Line 24, "appliance," should read -- appliances, --;
Lines 51 and 56, "claim 6," should read -- claim 9, --; and
Line 57, "microprocessor," should read -- microprocessor --.

Column 17,
Line 11, "wherein," should read -- wherein --; and
Line 13, "subbands" should read -- sub-bands --.

Column 18,
Line 19, "claim 29," should read -- claim 27, --.

Signed and Sealed this

Twenty-seventh Day of July, 2004

JON W. DUDAS
*Acting Director of the United States Patent and Trademark Office*